(12) United States Patent
Ganguly

(10) Patent No.: US 8,103,815 B2
(45) Date of Patent: Jan. 24, 2012

(54) LAZY HANDLING OF END OF INTERRUPT MESSAGES IN A VIRTUALIZED ENVIRONMENT

(75) Inventor: Shuvabrata (Joy) Ganguly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/216,584

(22) Filed: Aug. 24, 2011

(65) Prior Publication Data

US 2011/0307641 A1 Dec. 15, 2011

Related U.S. Application Data

(63) Continuation of application No. 12/163,891, filed on Jun. 27, 2008, now Pat. No. 8,032,680.

(51) Int. Cl.
*G06F 9/48* (2006.01)
(52) U.S. Cl. .................................. 710/264; 719/313
(58) Field of Classification Search .................. 710/260, 710/262–264; 719/313
See application file for complete search history.

(56) References Cited

U.S. PATENT DOCUMENTS

| | | | |
|---|---|---|---|
| 5,367,661 A | 11/1994 | Hough et al. | |
| 6,219,741 B1 | 4/2001 | Pawlowski et al. | |
| 6,470,408 B1 | 10/2002 | Morrison et al. | |
| 6,766,398 B2 | 7/2004 | Holm et al. | |
| 7,209,994 B1 | 4/2007 | Klaiber et al. | |
| 7,707,341 B1 | 4/2010 | Klaiber et al. | |
| 7,853,744 B2 | 12/2010 | Mahalingam et al. | |
| 8,032,680 B2 * | 10/2011 | Ganguly | 710/264 |
| 2004/0117532 A1 | 6/2004 | Bennett et al. | |
| 2004/0205272 A1 | 10/2004 | Armstrong et al. | |
| 2005/0102671 A1 | 5/2005 | Baumberger | |
| 2005/0228921 A1 | 10/2005 | Sethi et al. | |
| 2005/0235068 A1 | 10/2005 | Moriki et al. | |
| 2006/0085179 A1 | 4/2006 | Hack et al. | |
| 2007/0157197 A1 | 7/2007 | Neiger et al. | |
| 2008/0015712 A1 | 1/2008 | Armstrong et al. | |
| 2008/0114916 A1 | 5/2008 | Hummel et al. | |
| 2008/0141277 A1 | 6/2008 | Traut et al. | |
| 2009/0328035 A1 | 12/2009 | Ganguly | |

OTHER PUBLICATIONS

Liu et al.; "A Lazy EDF Interrupt Scheduling Algorithm for Multiprocessor in Parallel Computing Environment"; Algorithms and Architectures for Parallel Processing 7th International Conference, ICA3PP 2007, Hangzhou, China, Jun. 11-14, 2007; Springer Berlin/Heidelberg; 2007.*

Intel Virtualization Technology Specification for the IA-32 Intel Architecture, retrieved at <<http://www.cs.utah.edu/classes/cs7940-010-rajeev/spr06/papers/vm.pdf>>, Intel, Apr. 2005, pp. 1-35.

Interrupt in Hypertransport Technology, retrieved on Apr. 16, 2008 at <<http://cpu-hypertransport.blogspot.com/2007/06/interrupt-in-hypertransport-technology.html>>, Hypertransport CPU Technology, Jun. 26, 2007, pp. 1-5.

(Continued)

*Primary Examiner* — Glenn A Auve
(74) *Attorney, Agent, or Firm* — Lee & Hayes, PLLC

(57) ABSTRACT

Techniques enable reducing a number of intercepts performed by a hypervisor by reducing a number of End Of Interrupt (EOI) messages sent from a virtual central processing unit (CPU) to a virtual advanced programmable interrupt controller (APIC). The EOI path of the guest operating system running on the virtual CPU is altered to leave a marker indicating that the EOI has occurred. At some later time the hypervisor inspects the marker and lazily updates the virtual APIC state.

20 Claims, 8 Drawing Sheets

OTHER PUBLICATIONS

Interrupts and Interrupt-Controllers, retrieved on Apr. 16, 2008 at <<http://www.evilbitz.com/2006/12/08/interrupts-and-interrupt-controllers/>>, The Zana Zen, Dec. 8, 2006, pp. 1-6.

KVM-65 Released, Supports S390 Architecture, retrieved on Apr. 16, 2008 at <<http://virtualization.com/news/2008/04/07/kvm-65-released-supports-s390-architecture/>>, Virtualization.com, Apr. 7, 2008, pp. 1-7.

Senthilvelan et al., "Study of Content-Based Sharing on the Xen Virtual Machine Monitor," retrieved at <<http://pages.cs.wisc.edu/-remzi/Classes/736/Spring2005/Projects/Muru-Selva/cs736-report.pdf>>, 2005, 10 pages.

Yang et. al., "Using Hypervisor to Provide Data Secrecy for User Applications on a Per-Page Basis," VEE, 2008, ACM Mar. 5-7, 2008, 9 pages.

* cited by examiner

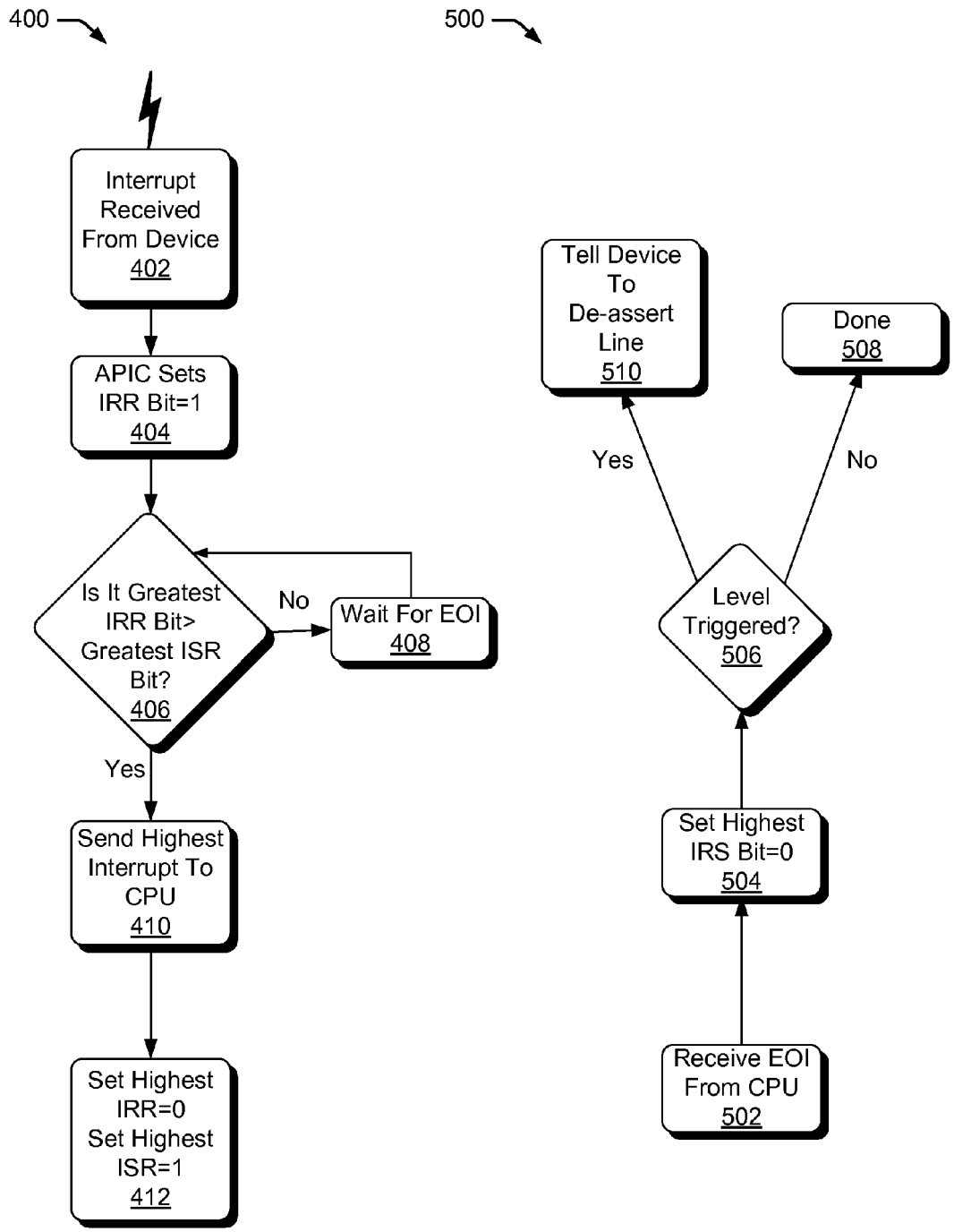

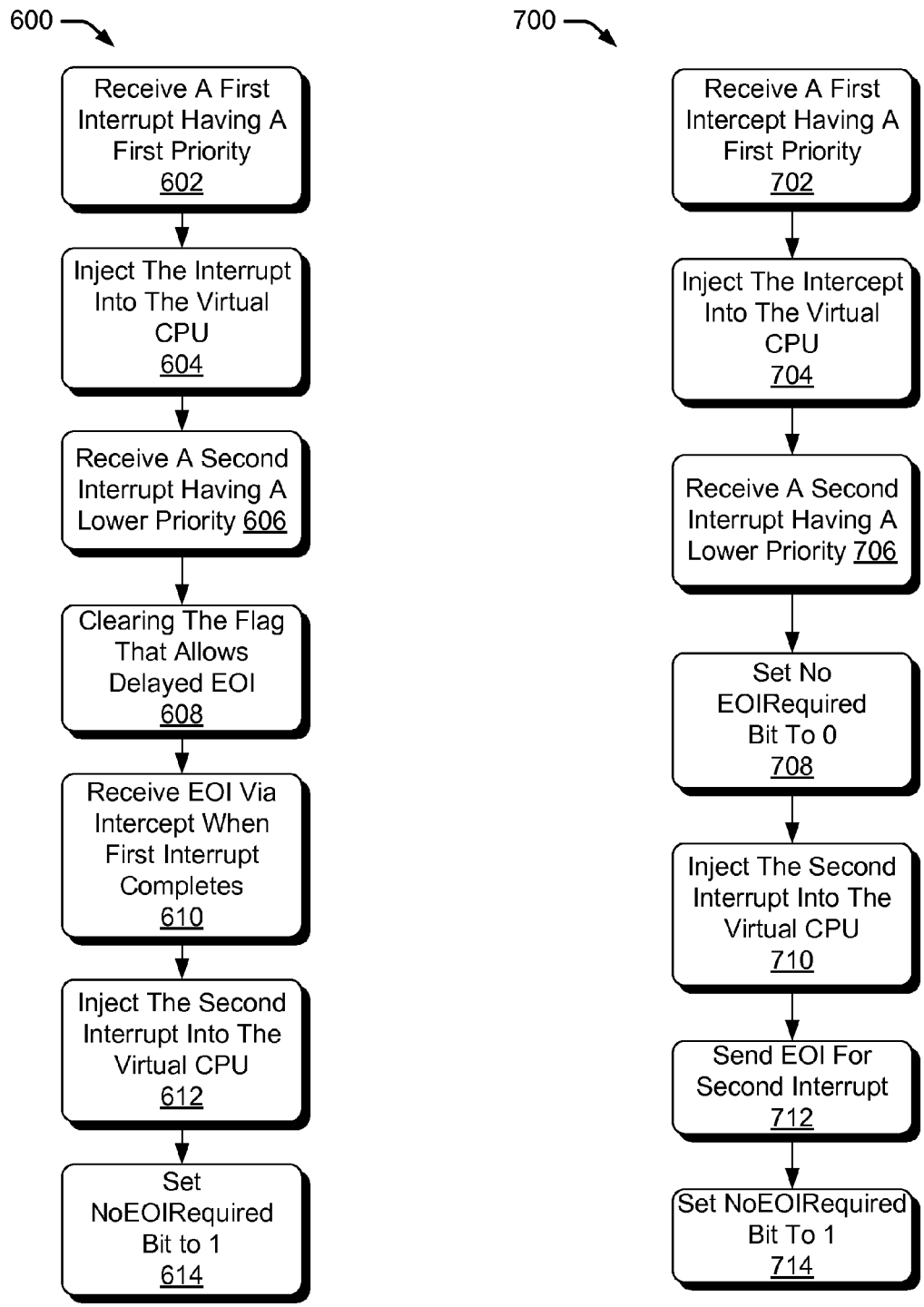

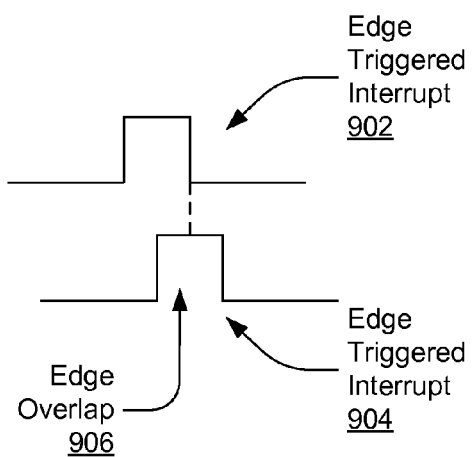
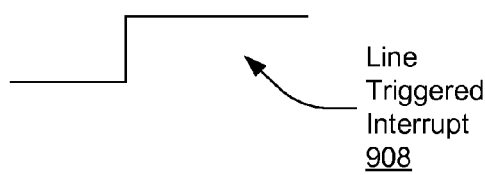
FIG. 9

LAZY HANDLING OF END OF INTERRUPT MESSAGES IN A VIRTUALIZED ENVIRONMENT

RELATED APPLICATION

This application is a continuation of U.S. patent application Ser. No. 12/163,891, filed on Jun. 27, 2008, which is incorporated by reference herein in its entirety.

BACKGROUND

The computer industry is trending towards more and more virtualization at the hardware level. In these environments, operating systems are run on top of a virtual machine monitor or hypervisor, where interaction with the computer hardware by a guest operating system is mediated by a virtualization layer. This allows multiple guest operating systems (OSs), to run concurrently on a single computer, making it possible to run multiple workloads on the same physical machine. Each workload may execute on a different guest OS, with strong isolation between guest OS. This is particularly beneficial for information technology (IT) departments or any operation that requires running multiple workloads or multiple server applications.

Allowing multiple guest OSs to run on a single computer may be accomplished by apportioning hardware resources to each guest OS in a safe yet efficient way. Traditionally, a hypervisor apportions hardware resources by exposing hardware devices to each guest OS as virtual hardware devices. Some physical hardware devices are virtualized by mediating direct access to the physical hardware device. Other physical hardware devices are virtualized by intercepting requests to the underlying device and implementing the requested functionality by utilizing the underlying hardware device in a related way. Still other physical hardware devices are completely emulated. Depending on the amount of intervention and emulation necessary to implement the virtual hardware device, the added cost of executing a function on a virtual hardware device may vary significantly. While mediating access to physical hardware devices may increase the computing cost by a modest percentage, software emulation of a physical hardware device may be extremely costly.

For instance, when a guest OS accesses a virtual hard disk to read a block of data, the hypervisor may intercept the function call. The hypervisor may implement the functionality by allowing direct access to the hard disk, or alternatively by reading a block of data from a file containing the contents of a virtualized hard disk. These two levels of hypervisor intervention may modestly increase the system resources necessary to complete the function call. On the other hand, virtualization of hardware devices such as an Advanced Programmable Interrupt Controller (APIC) may require many multiples of the system resources that are necessary to access a physical APIC.

SUMMARY

This document describes techniques capable of lazily communicating End Of Interrupt (EOI) messages from a guest OS to an Input/Output Advanced Programmable Interrupt Controller (I/O APIC) virtualization module executing in a hypervisor. Lazily communicating an EOI entails writing to a memory indicating that the EOI occurred, allowing the I/O APIC virtualization module to read the memory at a later time. Some implementations employ a memory page shared between the hypervisor and the guest OS to lazily communicate when an EOI has taken place on the virtualized CPU the guest OS is running on. Some implementations may also employ the shared memory page for the hypervisor to communicate to the guest OS when an EOI may be communicated lazily. Some implementations utilize an enlightened guest OS executing an enlightened EOI handler to process EOI messages according to the indication given by the hypervisor. The techniques therefore allow many EOI messages to be processed by the hypervisor without the unnecessary cost of the hypervisor intercepting and emulating EOI messages generated by the guest OS.

BRIEF DESCRIPTION OF THE DRAWINGS

The detailed description is described with reference to accompanying figures. In the figures, the left-most digit(s) of a reference number identifies the figure in which the reference number first appears. The use of the same reference numbers in different figures indicates similar or identical items.

FIGS. 4-5 depict an illustrative process for receiving an interrupt request at an APIC, sending the request to a CPU, receiving an EOI corresponding to the interrupt from the CPU, and processing the EOI.

FIGS. 6-8 depict additional illustrative processes for determining when a hypervisor may determine that an EOI must be immediately sent to the I/O APIC virtualization module.

FIG. 9 depicts illustrative edge-triggered and level-triggered interrupts.

DETAILED DESCRIPTION

Overview

The following discussion targets techniques capable of lazily communicating End Of Interrupt (EOI) messages from a guest OS to an Input/Output Advanced Programmable Interrupt Controller (I/O APIC) virtualization module. These techniques enable a guest OS to accurately and more efficiently handle interrupt requests without unnecessarily causing the hypervisor to trap and intercept an EOI communication. These techniques may utilize a shared memory page to facilitate communication between the hypervisor and the guest OS. Using the shared memory page, the hypervisor may communicate to the guest OS when an EOI must be immediately transmitted to the hypervisor or alternatively when an EOI may be lazily retrieved by the hypervisor. Also, when the hypervisor has indicated that an EOI may be processed lazily, and when the virtualized CPU executing the guest OS issues an EOI, the guest OS may use the shared memory to indicate that an EOI has occurred. The hypervisor may check for this indication while it is executing for other reasons, saving the cost of trapping and intercepting an immediate transmission of the EOI.

A first section entitled "Illustrative Virtualized Operating Environment" sets forth an environment that may enable these and other actions. An "Illustrative virtualized I/O APIC environment and interrupt handling process" section follows, which describes how interrupts received by a virtual I/O APIC may be processed. The third section entitled "Illustrative processing of an interrupt" depicts illustrative steps a virtual I/O APIC may take when processing an interrupt. The fourth section entitled "Determining when to immediately communicate an EOI to the hypervisor" describes conditions under which the hypervisor may indicate to the guest OS that EOI messages should be sent immediately to the hypervisor. The fifth section entitled "graphical interrupt representation" depicts two common types of interrupts.

This brief introduction is provided for the reader's convenience and is not intended to limit the scope of the claims, nor the proceeding sections.

Illustrative Virtualized Operating Environment

The following discussion describes an illustrative virtual operating environment to assist the reader in understanding some ways in which various aspects of the techniques may be employed. The environment described below constitutes but one example and is not intended to limit application of the techniques to any one particular operating environment. Other environments may be used without departing from the spirit and scope of the claimed subject matter.

Figure 1:
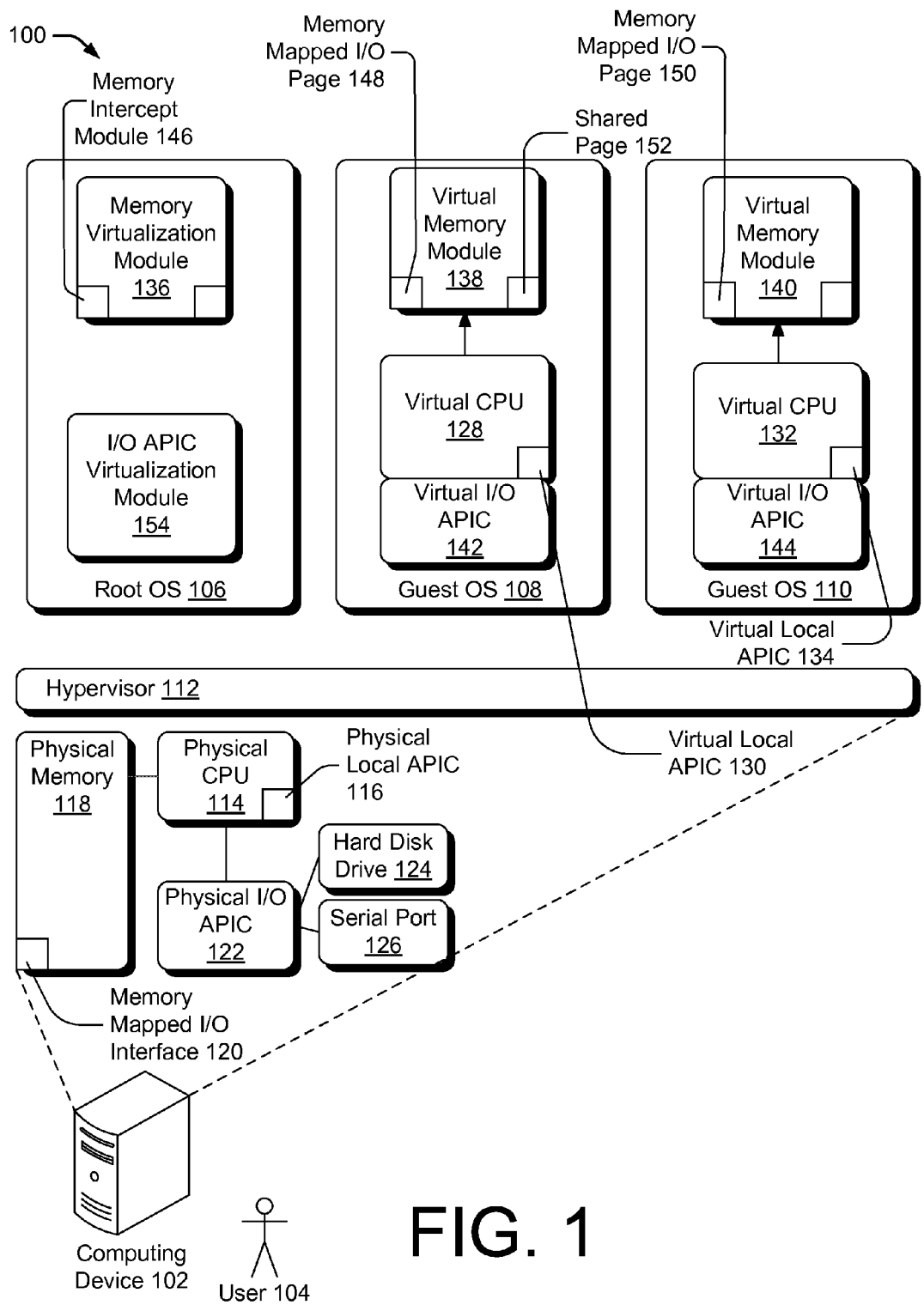
FIG. 1 depicts an illustrative environment in which an EOI generated by a virtual CPU may be lazily evaluated by a virtual I/O APIC emulated by a hypervisor.

FIG. 1 depicts one such virtualized environment 100 including a computing device 102 operated by a user 104. Although depicted as a server computer, the computing device 102 may alternatively be a desktop computer, a laptop computer, or any other computing device. In one implementation, the computing device 102 may simultaneously execute a root operating system 106, a guest operating system 108, and a guest operating system 110 on top of a hypervisor 112 (also known as a virtual machine manager). These operating systems may be any version of Microsoft Windows®, Linux®, Sun Solaris®, or any other operating system. Additionally or alternatively, guest operating systems alone may execute on the computing device 102.

In one implementation the hypervisor 112 executes directly on the physical hardware devices coupled to the computing device 102, managing and allocating these physical hardware devices. Additionally or alternatively, the root OS 106 may own the physical hardware devices coupled to the computing device 102. In one implementation, the computing device 102 includes a physical Central Processing Unit (CPU) 114 coupled to a physical memory 118. The physical CPU 114 may comprise a physical local Advanced Programmable Interrupt Controller (APIC) 116, and may be coupled to a physical Input/Output Advanced Programmable Interrupt Controller (I/O APIC) 122.

Hardware devices may request that the CPU 114 interrupt its current execution to service the interrupting hardware device. Traditionally, there have been two types of interrupts: level triggered interrupts and edge triggered interrupts. Edge triggered interrupts are a so called "fire and forget interrupt," in which an interrupting device transmits an edge-triggered interrupt to an I/O APIC by asserting on its line a positive voltage, followed immediately by de-asserting the line. This change of voltage creates an edge that may be interpreted by the APIC as an interrupt. Once the interrupt is sent, the line from the device to the APIC remains de-asserted. A level triggered interrupt is also initiated by asserting a positive voltage on a line connecting the interrupting device to the APIC. Unlike the edge-triggered interrupt, when sending a level-triggered interrupt the interrupting device does not de-assert the line until the interrupting device receives an indication originating from the CPU that the interrupt has been handled. Thus, one purpose for a CPU to send an EOI is to signal to the interrupting device that the interrupt has been completed, so that the asserting device may de-assert its line. Level triggered interrupts are used on some busses, such as the PCI bus, so that interrupts are not lost during processing. Edge triggered interrupts may be lost if a first edge overlaps a second edge, in which case the second edge will not be seen by the receiving I/O APIC.

The physical I/O APIC 122 may receive interrupt signals from a hardware device, such as a hard disk drive 124 or a serial port 124 126. For instance, the hard disk drive 124 may use an interrupt to indicate to the physical CPU 114 that an asynchronous DMA transfer has completed. In this scenario, the hard disk drive 124 sends an interrupt to the physical I/O APIC 122 to request that the physical CPU 114 execute the interrupt request handler associated with the hard disk drive 124. The physical I/O APIC 122 may then interrupt the physical CPU 114, causing the physical CPU 114 to save the current execution context, and begin executing the interrupt request handler associated with the hard disk drive 124.

The physical I/O APIC 122 may have a number of pins on which interrupt request signals are received. In one implementation, the physical I/O APIC 122 may have 255 pins, where each pin corresponds to a vector from 0 to 255, although I/O APICs with different numbers of pins are contemplated. In one implementation, an operating system assigns a vector to each hardware device, where devices having a higher priority are assigned greater numbered vectors than devices having lesser priority. In one implementation, interrupt requests from a hardware device are identified by the vector assigned to that hardware device. The operation of the I/O APIC is described in more detail below in FIG. 2.

Additionally or alternatively, an I/O APIC provides for inter-processor interrupts (IPIs). The physical I/O APIC 122 may provide a mechanism for the physical CPU 114 to send an interrupt to another CPU, perhaps as part of a multiprocessor system. To perform an IPI, the CPU writes to an Interrupt Control Register (ICR), which in turn sends an interrupt to the destination processor. Additionally or alternatively, the physical CPU 114 may request an interrupt for itself via the ICR.

In one implementation, the physical CPU 114 may contain the physical local APIC 116. The physical local APIC 116 may comprise 255 pins, each corresponding to a vector from 0-255. In other embodiments, different numbers of pins are contemplated, typically corresponding to the number of pins contained by the physical I/O APIC 122. The physical local APIC 116 may receive messages from the physical I/O APIC 122 and send messages to the physical I/O APIC 122.

In one implementation, the hypervisor 112 may virtualize the physical devices coupled to the computing device 102, presenting virtual hardware devices to each guest OS executing on top of the hypervisor 112. In one implementation, the virtual hardware devices provide identical or nearly identical functionality as their non-virtual counterparts. In one implementation, the root OS 106 owns all of the physical hardware devices contained in the computing device 102, such as the physical CPU 114, the physical memory 118, the physical I/O APIC 122, the hard disk drive 124 and the serial port 124 126. In this embodiment, the root OS 106 provides virtual hardware devices to the other guest operating systems. Additionally or alternatively, the hypervisor 112 may own all of the physical hardware devices contained in the computing device 102, and provide virtual hardware devices to the guest operating systems 108 and 110.

In one implementation, the root OS 106 provides a virtual CPU 128 to the guest OS 108, and a virtual CPU 134 to the guest OS 110. The virtual CPU 128 and the virtual CPU 134 may include a virtual local APIC 130 and a virtual local APIC 123, respectively. In one embodiment, the virtual CPU 128 and the virtual CPU 134 are thinly-wrapped virtual devices that allow the guest OSs to directly access the underlying physical CPU 114. In one embodiment, the virtual local APIC 130 and the virtual local APIC 123 may be emulated in software in the root OS 106. By the nature of emulation, receiving and processing interrupts at the virtual local APICs 130 and 123 may be significantly more costly than the when performed by the physical local APIC 116.

Additionally or alternatively, a memory virtualization module 136 may provide each guest OS with a virtual memory, such as a virtual memory 138 associated with the guest OS 108 and a virtual memory 140 associated with the guest OS 110. The virtual CPU 128 and the virtual CPU 134 may each be coupled to a virtual I/O APIC 142 and a virtual I/O APIC 144, respectively. Similar to the virtual local APICs, the virtual I/O APICs may be emulated in the root OS 106 or the hypervisor 112 by an I/O APIC virtualization module 154.

In one implementation, interrupts generated by hardware devices are received by the virtual I/O APIC 142, forwarded to the virtual local APIC 130, and handled by the virtual CPU 128. Upon receipt of the interrupt, the virtual CPU 128 changes its execution context to a service routine associated with the interrupt. The service routine may be responsible for handling the interrupt, in one implementation, by communicating with the device that sent the interrupt. Once the virtual CPU 128 has finished executing the service routine, the virtual CPU 128 notifies the virtual I/O APIC 128 that it is done with the interrupt using an End Of Interrupt Acknowledgement (EOI).

On a traditional computer, a CPU such as the physical CPU 114 transmits an EOI message to the physical I/O APIC 122 via a Memory Mapped I/O page 120. On a traditional computer, the memory mapped I/O page 120 allows the physical CPU 114 to communicate with the physical I/O APIC 118 by writing to what appears to be a page of memory, but is actually a means of communicating with the physical I/O APIC 122. In a virtualized environment, multiple virtual CPUs may each access a different virtual memory, each of the virtual memories backed by the single physical memory 118. If multiple virtual CPUs were allowed to naively access the physical I/O APIC 122 at the same time, the physical I/O APIC 122, and hence the entire computing device 102 could crash. In order to prevent this, an I/O APIC virtualization module 154 installs a memory intercept module 146 on a memory mapped I/O page 148 and a memory mapped I/O page 150, so that any attempts by a virtual CPU to communicate with the physical I/O APIC 120 will trap into the I/O APIC virtualization module 154. The APIC virtualization software 154 may then, executing in the context of the root OS 106 or alternatively the hypervisor 112, emulate a physical APIC in software.

For instance, the virtual CPU 128 may issue a self-interrupt by writing to the memory mapped I/O page 148. The virtual CPU 128 may be programmed to expect that writing to this page of memory will communicate to the physical I/O APIC 122. Instead, the memory operation intended to be received by the physical I/O APIC 122 is trapped by the I/O APIC virtualization module 154 executing in the root OS 106. The I/O APIC virtualization module 154 may then emulate the physical I/O APIC 122. In the case of a self-interrupt, the I/O APIC virtualization module 154 may call immediately into the hypervisor 112 to issue an interrupt to the virtual local APIC 130, which is also emulated in software. In this scenario, the self-interrupt issued by the virtual CPU 128 may be processed without using the physical I/O interrupt 122 or the physical local interrupt 116.

In another embodiment, the virtual CPU 128 may issue an Inter-Processor Interrupt (IPI) to one or all processors in a Multi-Processor (MP) system, such as the virtual CPU 134. In this case, the memory intercept module 146 in the root OS 106 traps the instruction intended for the physical I/O APIC 122. Similar to the processing of the self-interrupt described above, the I/O APIC virtualization module 154 may call in to the hypervisor to issue an interrupt to the virtual local APIC 123.

In one implementation, interrupts received by the virtual I/O APIC 142 may trigger an intercept in the memory intercept module 146. Then, the I/O APIC virtualization module 154 may process the received interrupt, emulating the virtual I/O APIC 142. These intercepts may happen frequently, sometimes tens of thousands of times per second. Every interrupt received and processed by the virtual I/O APIC 142 may be followed by an EOI sent from the virtual CPU 128 to the virtual I/O APIC 142. On a native system an EOI is not expensive—the physical CPU 114 simply talks to the physical I/O APIC 122. However, in a virtualized environment, it may take thousands of physical CPU cycles to emulate an EOI in the I/O APIC virtualization module 154, in addition to the CPU cycles required to perform the intercept.

In one implementation, the hypervisor 112 puts a piece of information into a shared page 152, indicating whether the guest OS 108 should or should not send an EOI to the virtual I/O APIC 142. If the hypervisor 112 tells the guest OS 108 to send the EOI, the guest OS 108 will generate an intercept by writing to the memory mapped I/O page 148 while attempting to communicate with the virtual I/O APIC 142. If, on the other hand, the hypervisor 112 tells the guest OS 108 via the shared memory 152 to lazily process the EOI, the guest OS 108 may not generate an intercept, and instead may write to the shared page 152 indicating that the EOI occurred.

Once the guest OS 108 has indicated that an EOI occurred by setting a flag in the shared memory 152, the hypervisor 112 may later read the shared memory 152, to determine whether an EOI was generated. If the hypervisor 112 determines that an EOI was generated by the virtual CPU 128, it notifies the I/O APIC virtualization module 154, which may update its state as described below with reference to FIG. 2. In this embodiment, the fact that an EOI has occurred is transmitted to the I/O APIC virtualization module 154, which implements the virtual I/O APIC 142 without unnecessarily generating a potentially time-consuming intercept.

Illustrative Virtualized I/O APIC Environment and Interrupt Handling Process

Figure 2:
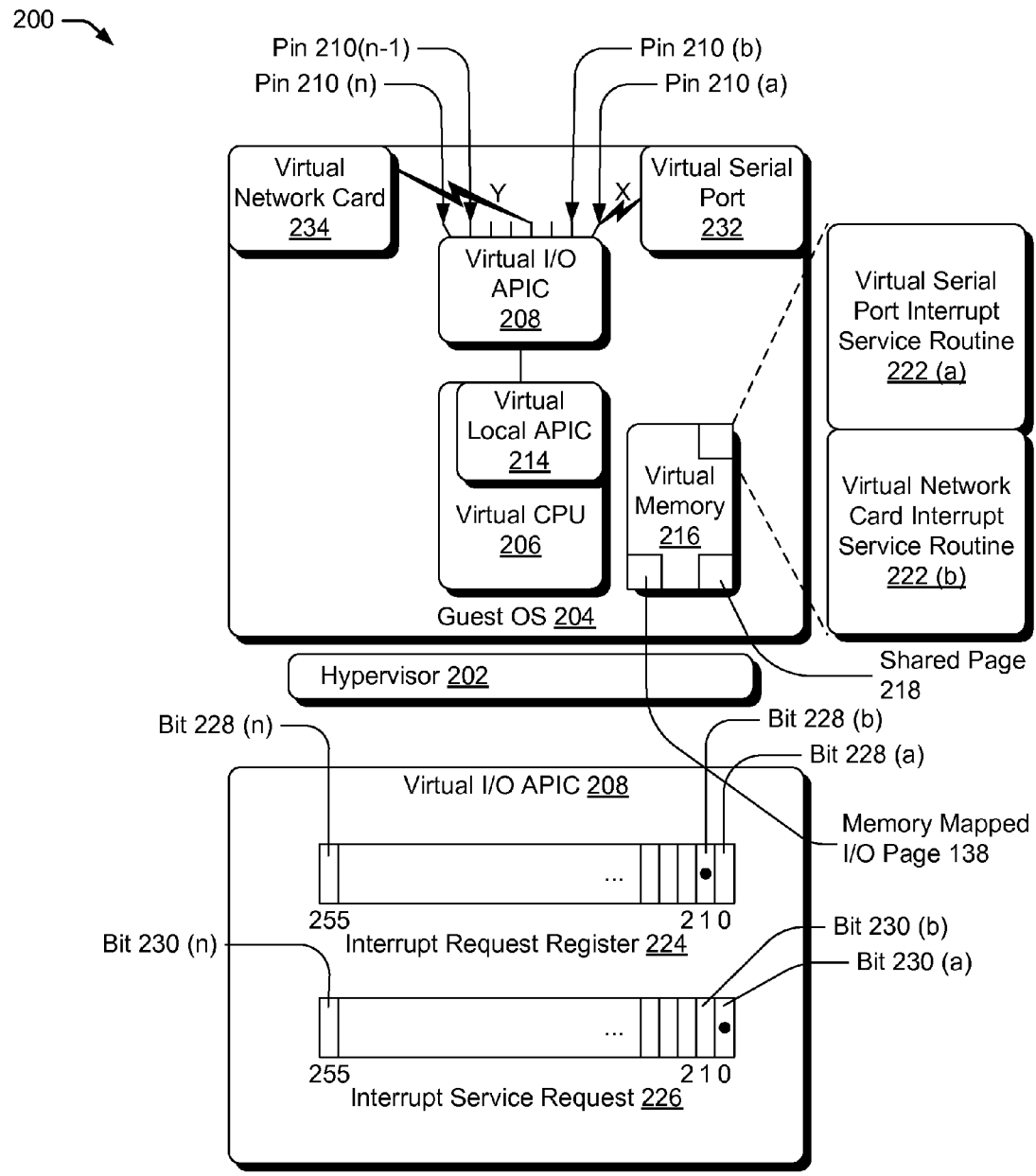
FIG. 2 depicts an illustrative virtual I/O APIC for receiving interrupt requests and forwarding the interrupt requests to a CPU.

FIG. 2 depicts an illustrative I/O APIC environment 200. A hypervisor 202 runs on top of physical computer hardware, enabling the execution of a guest OS 204 on a virtual CPU 206. A virtual I/O APIC 208 exposes a number of pins 210(*a*), 210(*b*), . . . , 210(*n*), which may be connected to hardware devices such as a virtual serial port 232 and a virtual network card 234. The guest OS 204 may assign priorities, or vectors, to each hardware device. In one implementation, a virtual I/O APIC 208 may have 255 pins, and the guest OS may assign priorities to hardware devices from 0 (lowest priority) to 255 (highest priority). In one embodiment, the virtual serial port 232 is assigned a priority of 0, while the virtual network card 234 is assigned a priority of 3.

The virtual I/O APIC 208 may be coupled to a virtual CPU 202 that contains a virtual local APIC 214. In one implementation, the virtual CPU 202 may be connected to a virtual memory 216 that contains a shared page 218 and a memory mapped I/O page 214. Additionally, the virtual memory 216 may comprise a virtual serial port interrupt service routine 218 222(a) and a virtual network card interrupt service routine 218 222(b).

The virtual I/O APIC 208 may comprise two registers, each register containing one bit for each of the pins 210. In one implementation, the two registers each contain 256 bits. One register may be an Interrupt Request Register (IRR) 224, which may contain bits 228 228(a) ... 228 228(n). The other register may be the Interrupt Service Register (ISR) 226, which may contain bits 230(a) ... 230(n). In one implementation, an interrupt may be received by the virtual I/O APIC 208 from the virtual serial port 232 on the pin 210(a). In one implementation, the bit 228 228(a) corresponding to the pin 210(a) on which the interrupt was received is set to 1, indicating the interrupt has been received. The interrupt may then be forwarded to the virtual local APIC 214 located on the virtual CPU 206, and the virtual local APIC 214 may in turn "interrupt" the execution of the virtual CPU 206.

Once the virtual local APIC 214 has "interrupted" the virtual CPU 206, the virtual CPU 206 may acknowledge to the virtual I/O APIC 208 that it has received the interrupt, causing the virtual I/O APIC 208 to clear the bit 228 228(b) by setting its value to 0. The virtual I/O APIC 208 may also set the bit in the ISR 230 corresponding to the pin the interrupt was received on. In this scenario, the bit 230(a) may be set to 1. Once the bit 228 228(a) is cleared and the bit 230(a) is set, the virtual CPU 206 is in the process of handling the interrupt. While the virtual CPU 206 is handling the interrupt, a second interrupt may be received by the virtual I/O APIC 208 on the pin 210(a).

Upon receipt of the interrupt, the virtual CPU 206 may save its current execution context, that is the current state of its registers, and call the virtual serial port interrupt service routine 218 222(a) associated with the interrupt. Once the virtual CPU 206 has finished executing the virtual serial port interrupt service routine 218 222(a), the virtual CPU 206 notifies the virtual I/O APIC 208 by writing to the memory mapped I/O page 148, which may cause an intercept by the hypervisor 202. In one implementation, this notification comprises an End Of Interrupt Acknowledgement, or EOI. The EOI notifies the virtual I/O APIC 208 that the virtual CPU 206 has completed handling the highest priority, and therefore most recently completed, pending interrupt. In response to the EOI, the virtual I/O APIC 208 clears the highest priority bit in the ISR. In the above example, the virtual I/O APIC 208 may clear the bit 230(b).

In one embodiment, the guest OS 204 may infer from a flag set by the hypervisor 202 whether to immediately send an EOI or whether to lazily evaluate the EOI. The hypervisor 202 may determine whether an EOI must be immediately sent based on the state of the virtual I/O APIC 203. What follows below are three illustrative scenarios when an EOI must be sent immediately.

In one scenario, two devices may send an interrupt to the virtual I/O APIC 203. By way of example, the network card 234 and the serial port 232 may send an interrupt vector X and interrupt vector Y, respectively, during the same clock cycle. In one implementation, the priority of interrupt vector Y is greater than the priority of interrupt vector X. In one implementation, the virtual I/O APIC 208 may set a bit corresponding to interrupt X to 1 in the IRR 224, and also set a bit corresponding to interrupt Y to 1 in the IRR 224. Then, at every clock cycle, the virtual I/O APIC 208 may determine the highest numbered bit that is set in the IRR 224 register. The virtual I/O APIC 208 then, via the virtual local APIC 214, interrupts the CPU with interrupt Y, the highest priority interrupt. Once the virtual CPU 206 acknowledges the receipt of interrupt Y, the virtual I/O APIC 208 sets the ISR bit corresponding to Y to 1 and sets the IRR bit corresponding Y to 0, indicating that Y is being handled by the virtual CPU 203.

Continuing the scenario, interrupt vector X has remained waiting for the higher priority interrupt Y to finish, and will continue waiting until the virtual CPU 206 indicates to the virtual I/O APIC 208 that Y has completed. If interrupt Y were the only interrupt pending in the virtual I/O APIC 203, then the hypervisor 202 would indicate via the shared page 218 that the guest OS may evaluate the EOI lazily. However, because interrupt X is waiting to be processed, lazily updating the EOI may delay the time by which interrupt X is processed, degrading system performance. Therefore, when the hypervisor 202, via the I/O APIC virtualization module 154, detects a second, lower-priority interrupt is pending at the virtual I/O APIC 203, the hypervisor 202 may indicate via the shared page 218 that any EOI generated by the virtual CPU 206 must be transmitted immediately.

Another common scenario may occur when a first interrupt is being handled by the virtual CPU 206, and a second, higher priority interrupt is received by the virtual I/O APIC 203. In this scenario, the virtual I/O APIC 208 uses the ISR register 226 to maintain a stack of nested interrupt handlers that are executing on the virtual CPU 206. By way of example, if interrupt X is being handled by the virtual CPU 206, and the virtual I/O APIC 208 receives interrupt Y, Y having a higher priority than X, then the virtual I/O APIC 208 will interrupt the CPU with interrupt Y.

Interrupt Y will literally interrupt the execution of X's service request handler, before the virtual CPU 206 is finished executing X's service request handler. X's service request handler is placed on a stack of service request handlers. Once both of the interrupt requests X and Y have been sent to the virtual CPU 206, the IRR bits associated with these interrupts will be set to 0, while the ISR bits associated with interrupts will be set to 1, indicating that both interrupts have been sent to the virtual CPU 206. In one embodiment, the shared page 206 may contain a single bit to indicate whether an EOI has occurred. Because there are two interrupts pending, and only one bit of information, it would be impossible for the hypervisor 202 to determine whether one or both interrupts had generated an EOI. Therefore, the guest OS 204 is configured to send an EOI when the first of the two interrupts completes.

Continuing the example, once the service request handler for interrupt Y completes, the virtual CPU 206 will return an EOI to the virtualized I/O APIC 208 because there are at least two bits set in the ISR 226. The virtualized I/O APIC 208 will clear the ISR bit associated with interrupt Y, and the CPU will continue processing the service request handler for interrupt X. Upon processing the EOI for interrupt Y, the virtual I/O APIC 208 will re-prioritize, and determine that there is only one interrupt pending at the virtual CPU 206. Accordingly, the hypervisor will set the bit in the shared page 218 indicating that the guest OS may lazily evaluate an EOI.

Level-triggered interrupts comprise the third scenario requiring a guest OS to immediately send an EOI to the hypervisor for processing. A level-triggered interrupt may not be lazily evaluated, because the hardware device triggering the interrupt will continue to assert its line longer than necessary, and therefore will be prevented from issuing a subsequent interrupt. As a result, the hypervisor 202 will require that an EOI associated with a level-triggered interrupt be immediately transmitted, generating an intercept in the hypervisor, so that the interrupting device can de-assert its line.

Illustrative Processing of an Interrupt

Figure 3:
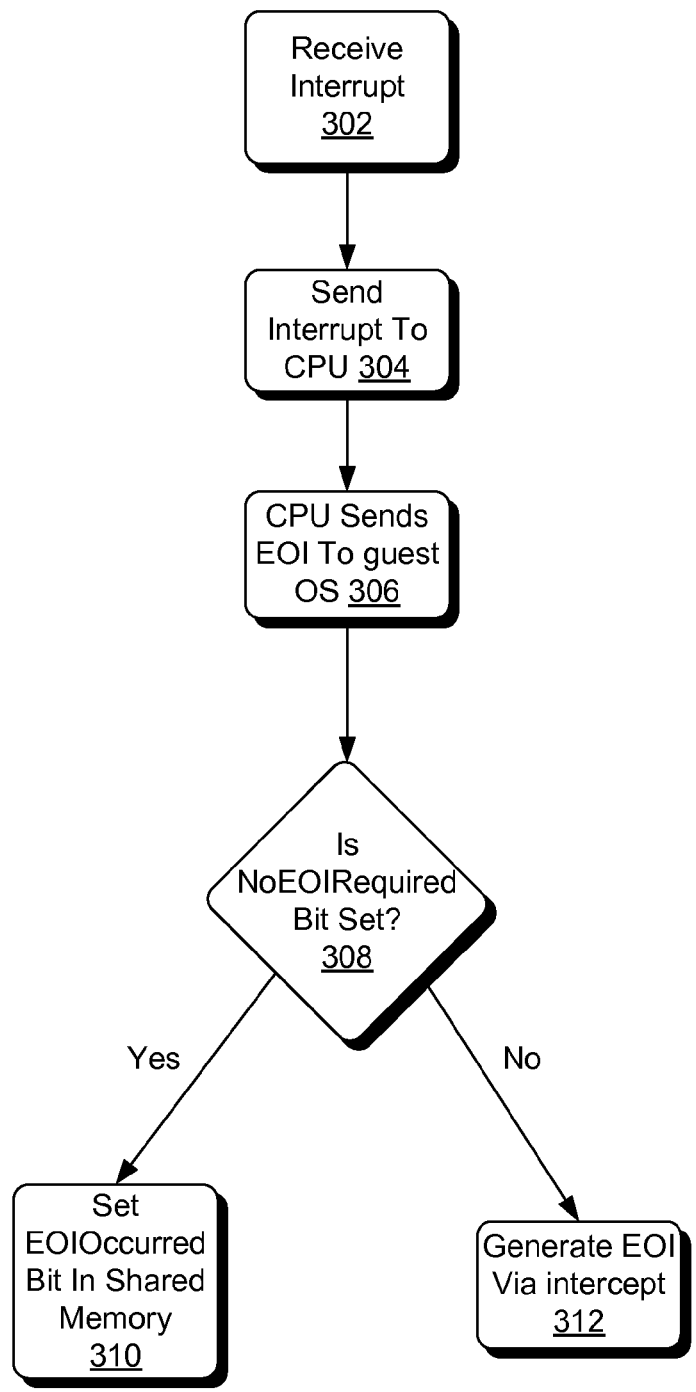
FIG. 3 depicts an illustrative process for determining when to generate an intercept to process an EOI, and when to lazily handle the EOI.

FIG. 3 depicts an illustrative process for determining when to generate an intercept to process an EOI, and when to lazily handle the EOI. Process 300 begins when act 302 receives an interrupt request from a virtual hardware device, such as the virtual network card 234. At act 304, meanwhile, the interrupt is sent to the virtual CPU 206 to be processed. In one embodiment, the received interrupt is the only interrupt currently pending at the virtual I/O APIC 203, while no interrupts are currently being handled by the virtual CPU 206. At act 306, meanwhile, the virtual CPU 206 generates an EOI and sends the EOI to the guest OS 204. At act 308, the guest OS 204 determines, by reading the shared page 218, whether the NoEOIRequired bit is set to 1. If it is, the guest OS will respond by setting the EOIOccurred bit in the shared memory 218. Later, when the hypervisor 202 is executing for some other reason, the hypervisor 202 may read the shared page 218 and determine that the EOI occurred. In one implementation, the I/O APIC virtualization module 154 will process the occurrence of the EOI by clearing the bit associated with the interrupt received in act 302 from the ISR register of the virtual I/O APIC 203. On the other hand, if the NoEOIRequired bit was cleared, or not set, then the guest OS 204 will generate an EOI, causing the hypervisor 202 to intercept the EOI and process it immediately.

FIG. 4 describes an illustrative process 400 for determining how a traditional, physical I/O APIC responds to the receipt of an interrupt. Process 400 begins at act 402 with receipt of an interrupt request from a physical hardware device, such as the serial port 124 126. The interrupt may be an edge-triggered or level-triggered interrupt. Act 404, meanwhile, sets the Interrupt Request Register (IRR) bit associated with the pin on which the interrupt was received to 1. If the interrupt was an edge-triggered interrupt, the serial port 124 126 will de-assert the line on which it transmitted the interrupt. If, on the other hand, the interrupt was a level-triggered interrupt, the serial port 124 will continue to assert the line until the serial port 124 126 is notified that the CPU has completed processing the interrupt. At act 406, the APIC determines if the highest priority IRR bit set to 1 has a higher priority than the highest priority ISR bit set to 1. In many scenarios, none of the bits in the ISR will be set, because the target CPU typically processes interrupts quickly, reducing the likelihood that one interrupt will be received while another interrupt is processing. In another scenario, an interrupt that is already processing will have a higher priority than the interrupt that was just received. In this case, the received interrupt must wait for the higher priority interrupt to finish, as depicted by act 408.

At act 410, the priority of the highest priority IRR bit is greater than the priority of the highest priority ISR bit, causing the I/O APIC to send the received interrupt to the CPU. At act 412, the APIC updates the IRR and ISR registers associated with the received interrupt, setting the bit in the IRR to 0 the bit in the ISR 1. These bits indicate that the interrupt is no longer pending in the APIC (IRR bit=0) and that the interrupt is currently being executed by the CPU (ISR bit=1).

FIG. 5 describes an illustrative process 500 for determining how a traditional, physical APIC responds to the receipt of an EOI from a physical CPU. Process 500 begins at act 502 with receipt of an EOI from a CPU. The EOI may indicate that the highest priority interrupt being handled by the CPU has been completed. Act 504, meanwhile, clears the bit associated with the received EOI by setting it to 0. In one implementation the I/O APIC clears the highest priority bit because the CPU will always execute interrupts in order of their priority. In one implementation, the I/O APIC will then re-prioritize any pending interrupts, sending the next highest priority interrupt to the CPU for processing.

Act 506, meanwhile, determines whether the interrupt for which an EOI was just received was an edge-triggered interrupt or a level-triggered interrupt. At act 508, when the interrupt to which the EOI is responding is an edge-triggered interrupt, the APIC is finished processing the EOI. Act 510, however, is performed when the interrupt was a level-triggered interrupt, at which point the I/O APIC signals to the device that asserted the interrupt that the interrupt request has been completed, and that the device can de-assert its line to the I/O APIC.

Determining when to Immediately Communicate an EOI to the Hypervisor

FIG. 6 describes an illustrative process 600 depicting one condition under which an EOI generated by the virtual CPU 128 may be communicated directly to the hypervisor 112, and not lazily updated. Process 600 begins at act 602 with receipt of a first interrupt having a first priority at the virtual I/O APIC 142. It should be noted that the virtual I/O APIC 142 may be emulated in software by the hypervisor 112 or the root OS 106, and is only exposed to the guest OS 108 for execution. At act 604, the first interrupt may be injected into the virtualized CPU 128. At act 606, meanwhile, the virtual I/O APIC 142 may receive a second interrupt having a lower priority than the first interrupt, the second interrupt being received while the first interrupt is being processed by the virtual CPU 128. At act 608, meanwhile, the hypervisor 112 may clear the NoEOIRequired flag that is stored in the shared page 152. Clearing the NoEOIRequired flag indicates to the guest OS 108 that the guest OS 108 should transmit an EOI to the hypervisor, generating an intercept, as soon as the virtual CPU 128 completes processing the interrupt. The EOI should be transmitted immediately because the lower priority interrupt will only be injected upon receipt of an EOI at the I/O APIC virtualization module 154. Lazily updating the virtual I/O APIC 142 in this scenario may unnecessarily delay the processing of the lower priority interrupt. At act 610, meanwhile, the I/O APIC Virtualization module 154 receives the EOI generated when the first interrupt is completed. In one implementation, the Virtual I/O APIC 142 may clear the ISR bit associated with the first interrupt, recording that the interrupt has finished processing. At act 612, meanwhile, the virtual I/O APIC 142 may inject the second interrupt into the virtualized CPU 128 in response to receiving the EOI. At act 614, meanwhile, the hypervisor 112 may set the NoEOIRequired bit to 1, because there no longer is an interrupt pending.

FIG. 7 describes an illustrative process 700 depicting another condition under which an EOI generated by the virtual CPU 128 may be communicated directly to the hypervisor 112, and not lazily updated. Process 700 begins at act 702 with receipt of a first interrupt having a first priority at the virtual I/O APIC 142. At act 704, the first interrupt may be injected into the virtualized CPU 128. At act 706, meanwhile, the virtual I/O APIC 142 may receive a second interrupt having a higher priority than the first interrupt, the second interrupt being received while the first interrupt is being processed by the virtual CPU 128. At act 708, meanwhile, the hypervisor 112 may clear the NoEOIRequired flag that is stored in the shared page 152 by setting it to 0. Clearing the NoEOIRequired flag indicates to the guest OS 108 that the guest OS 108 should transmit an EOI to the hypervisor, generating an intercept, as soon as the virtual CPU 128 completes processing the interrupt. The EOI should be transmitted immediately because the virtual CPU 128 will have two interrupts pending completion, but the shared page 152 may only store whether an EOI was processed in one bit. Therefore, in order to ensure that an EOI is processed by the virtual I/O APIC 142 for each interrupt, the guest OS must transmit the first EOI generated to the hypervisor 112, generating an intercept. At act 710, meanwhile, the virtual I/O APIC 142 may inject the second, higher priority interrupt into the virtual CPU 128. The virtual CPU 128 may immediately being processing the second interrupt, delaying completion of the first interrupt until the second interrupt has itself been completed. At act 712, meanwhile, the virtual CPU 128 may send an EOI upon completing the second interrupt. This EOI may be sent immediately to the hypervisor, triggering an intercept. At act 714, meanwhile, the I/O APIC virtualization module 154 may respond to the received EOI by setting the NoEOIRequired bit to 1, as there now is only one interrupt pending, and it may be lazily evaluated.

Figure 8:
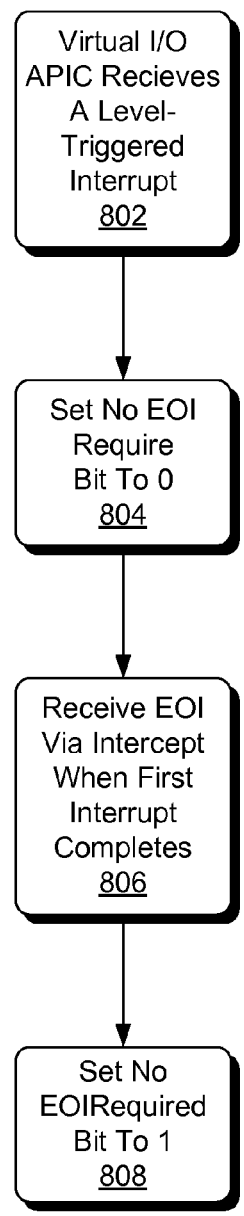

FIG. 8 describes an illustrative process 800 depicting another condition under which an EOI generated by the virtual CPU 104 may be communicated directly to the hypervisor 112, and not lazily updated. Process 800 begins at act 802 with receipt, at the virtual I/O APIC 142, of a level-triggered interrupt. At act 804, the hypervisor 112 may set the NoEOIRequired bit to 0, indicating that the guest OS 108 must send an EOI for this level-triggered interrupt. At act 806, meanwhile, the I/O APIC virtualization module 154 within the hypervisor 112 may receive an EOI from the guest OS 108 via intercept. The hypervisor may then set the NoEOIRequired bit to 1, indicating that subsequent level-triggered EOIs may be evaluated lazily.

Graphical Interrupt Representation

FIG. 9 depicts illustrative edge-triggered and level-triggered interrupts 900. In one implementation, an edge-triggered interrupt 902 is sent from a hardware device, such as the hard disk drive 124, to a virtual I/O APIC such as the virtual I/O APIC 142. In one implementation, another edge-triggered interrupt 904 may be transmitted on the same line, causing an edge overlap 906. The virtual I/O APIC 142 will see overlapping edge-triggered interrupts 902 and 904 as a single edge-triggered interrupt, because to the virtual I/O APIC 142 the line is consistently asserted.

A level-triggered interrupt 908 may be communicated from the hard disk drive 124 to the virtual I/O APIC 142 by asserting the line until an indication that the interrupt completed is received by the hard disk driver 124.

Figure 10:
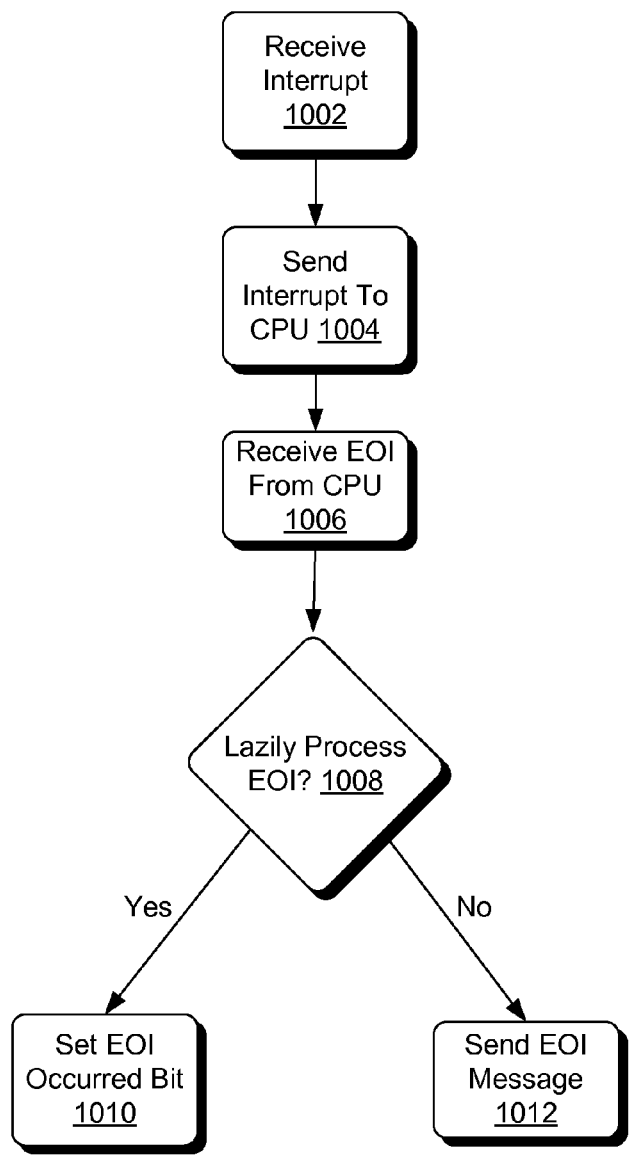
FIG. 10 depicts an illustrative process for determining whether an EOI message should be sent to a virtual application programming interface (API).

FIG. 10 describes an illustrative process 1000 of determining whether to lazily process an EOI. Process 1000 begins at act 1002 with receipt of a first interrupt service request having a first priority. In one embodiment, the interrupt is received at the virtual I/O APIC 142. At act 1004, the received interrupt may be sent to the CPU. In one embodiment, the CPU is the virtual CPU 128. At act 1006, meanwhile, an End Of Interrupt (EOI) acknowledgment is received from the CPU. The CPU may send the EOI upon completion of the processing of the received interrupt. At act 1008, meanwhile, the guest OS determines whether to lazily send the EOI, or whether to immediately send the EOI, causing the hypervisor to intercept the EOI acknowledgement. In one embodiment, immediately sending the EOI causes the hypervisor to intercept and process the EOI. At act 1010, meanwhile, when the EOI is to be lazily processed, the guest OS may write to a shared memory page. At act 1012, meanwhile, when the EOI is not to be lazily processed, the guest OS may invoke the hypervisor to directly transmit the EOI.

Moreover, any of the acts of any of the methods described herein may be implemented by a processor or other computing device based on instructions stored on one or more computer-readable media. Computer-readable media can be any available media that can be accessed by a hypervisor, guest OS, and/or I/O APIC virtualization module, as appropriate. Computer-readable media includes volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the hypervisor, guest OS, and/or I/O APIC virtualization module. Combinations of the any of the above should also be included within the scope of computer-readable media.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
under control of one or more processors configured with executable instructions:
receiving an interrupt service request from a virtual machine monitor;
determining whether the virtual machine monitor requests lazy processing of an End of Interrupt (EOI) acknowledgement;
in response to determining that the virtual machine monitor requests lazy processing of the EOI acknowledgement, writing the EOI acknowledgement to a shared memory of the virtual machine monitor.

2. The method as recited in claim 1, further comprising: sending the interrupt service request to a central processing unit (CPU); and
receiving the EOI acknowledgement from the CPU.

3. The method as recited in claim 1, wherein the determining comprises reading, from the shared memory of the virtual machine monitor, a value indicating whether to lazily process the EOI acknowledgement.

4. The method as recited in claim 1, wherein the determining further comprises determining whether an intercept associated with the interrupt service request is an edge-triggered interrupt or a level-triggered interrupt.

5. The method as recited in claim 4, further comprising in response to determining that the intercept associated with the interrupt service request is not a level-triggered interrupt, writing the EOI acknowledgement to the shared memory of the virtual machine monitor.

6. The method as recited in claim 1, wherein the determining further comprises determining whether the interrupt service request is the only active interrupt service request.

7. The method as recited in claim 1, wherein the shared memory of the virtual machine monitor comprises a page of physical memory simultaneously mapped to a page of guest operating system virtual memory and a page of virtual machine monitor virtual memory.

8. The method as recited in claim 1, wherein writing the EOI acknowledgement to the shared memory of the virtual machine monitor defers processing the EOI acknowledgement until the virtual machine monitor begins execution for a reason other than processing the EOI acknowledgement.

9. A method comprising:
under control of one or more processors configured with executable instructions:
receiving an interrupt;
receiving an End of Interrupt (EOI) acknowledgement corresponding to the interrupt; and
determining whether to lazily process the EOI acknowledgement based at least on a type of the interrupt.

10. The method as recited in claim 9, wherein the type of the interrupt comprises an edge-triggered interrupt or a level-triggered interrupt.

11. The method as recited in claim 9, further comprising determining to immediately process the EOI acknowledgement in response to determining that the type of the interrupt is a level-triggered interrupt.

12. The method as recited in claim 9, wherein determining whether to lazily process the EOI acknowledgement is further based on a result of determining whether another interrupt is pending to be processed.

13. The method as recited in claim 9, wherein the interrupt is received from a virtual machine monitor, and wherein determining whether to lazily process the EOI acknowledgement is further based on a result of determining whether the virtual machine monitor requests to lazily process the EOI acknowledgement.

14. The method as recited in claim 9, wherein determining whether the virtual machine monitor requests to lazily process the EOI acknowledgement comprises reading, from a shared memory of the virtual machine monitor, a value indicating whether to lazily process the EOI acknowledgement.

15. The method as recited in claim 9, further comprising in response to determining to lazily process the EOI acknowledgement, writing the EOI acknowledgement to a shared memory of a virtual machine monitor from which the interrupt is received.

16. A system comprising:
one or more processors;
memory, communicatively coupled to the one or more processors, storing instructions that, when executed by the one or more processors, configure the one or more processors to perform acts comprising:
receiving an interrupt service request from a virtual machine monitor;
inferring from a flag set by the virtual machine monitor to determine whether to immediately send an End of Interrupt (EOI) acknowledgement or lazily evaluate the EOI acknowledgement; and
performing an action based on the inferring, the action comprising immediately sending the EOI acknowledgement or lazily evaluating the EOI acknowledgement.

17. The system as recited in claim 16, wherein the flag set by the virtual machine monitor is read from a shared memory of the virtual machine monitor.

18. The system as recited in claim 16, further comprising determining a type of an interrupt associated with the interrupt service request.

19. The system as recited in claim 18, wherein the type of the interrupt comprises an edge-triggered interrupt or a level-triggered interrupt.

20. The system as recited in claim 18, wherein performing the action is further based on a result of the determining.

* * * * *